United States Patent
Kelada

[11] Patent Number: 6,001,262
[45] Date of Patent: Dec. 14, 1999

[54] CASCADE ION EXCHANGE FOR HIGH PURITY WATER PRODUCTION

[76] Inventor: Maher I. Kelada, P.O. Box 2247, Pearland, Tex. 77581

[21] Appl. No.: 08/874,450
[22] Filed: Jun. 16, 1997
[51] Int. Cl.⁶ .................................................. C02F 1/42
[52] U.S. Cl. .......................... 210/678; 210/685; 210/278; 210/284
[58] Field of Search ..................... 210/678, 685, 210/241, 264, 267, 278, 283, 284, 900

[56] References Cited

U.S. PATENT DOCUMENTS

| | | | |
|---|---|---|---|
| 3,985,648 | 10/1976 | Casolo | 210/27 |
| 4,280,912 | 7/1981 | Berry et al. | 210/662 |
| 4,548,716 | 10/1985 | Boeve | 210/652 |
| 5,024,766 | 6/1991 | Mahmud | 210/668 |
| 5,190,659 | 3/1993 | Wang | 210/663 |
| 5,259,972 | 11/1993 | Miyamuru et al. | 210/652 |
| 5,259,975 | 11/1993 | Mohn | 210/710 |

*Primary Examiner*—Ivars Cintins
*Attorney, Agent, or Firm*—Russell J. Egan

[57] ABSTRACT

A method and system for treating and purifying water on site provides a cascade series of alternating cation and anion beds with flow control controlling flow of water in a first direction to flow through all beds in sequence, to purify the water, and controlling back flow through only like ion resin beds to regenerate the resins contained therein. The subject system removes impurities which are ionic and dissolved in the water.

22 Claims, 3 Drawing Sheets

FIG. 8

CASCADE ION EXCHANGE FOR HIGH PURITY WATER PRODUCTION

BACKGROUND OF THE INVENTION

1. The Field of the Invention

The present invention pertains to a method and system for on site water purification treatment and, in particular, to a unit which uses a cascade ion exchange system to produce high purity water from a local water supply.

2. The Prior Art

There are a number of well known and effective means for total removal of impurities from water. For example, one technique uses flash evaporators, but these require a substantial capital investment. The invention of modem ion exchange technology has made it possible to produce high purity water without requiring the high capital expenses previously associated with flash evaporators. Thus flash evaporation, in many cases, is no longer considered to be an economical alternative for the provision of high purity water, especially for lower volume applications. Membrane separation, commonly known as reverse osmosis separation, has gained a great acceptance in the past few decades. It is capable of removing more than 95% of the dissolved solids from water feed streams in a single stage. The two-bed ion exchanger (a Strong Acid Cation (SAC) resin bed followed by a Strong Basic Anion (SBA) resin bed) is a common ion exchanger arrangement used in water purification systems. Multiple arrangements of strong and weak cation and anion beds are valid options for specific water treatment applications, but they are not suitable for all applications.

The purity of demineralized water is measured by the specific electrical resistance of the water, measured in ohms, to an electric current. Electric current has less resistance in the presence of high concentrations of electrolytes (dissolved ionized solids) than in low concentration solutions. Water with a specific resistance of 100,000 ohms-cm has an equivalent Total Dissolved Solids (TDS) of 2–3 ppm. Such water is considered "pure" and could be produced by a two-bed ion exchanger. Water with a specific resistance of 1,000,000 ohms-cm (1 Meg ohm-cm) has an equivalent TDS of 0.2–1.0 ppm. Such water is considered "very pure" and could be produced by a four-bed ion exchanger (two two-bed ion exchangers in series). A mixed bed ion exchanger is capable of producing water with a specific resistance of 2,000,000 ohms-cm (equivalent to 0.2–0.5 ppm TDS). A two-bed ion exchanger in series with a mixed bed is capable of producing water with a specific resistance of 10,000,000 ohms-cm (equivalent to 0.04–0.1 ppm TDS). This water is considered to be "ultrapure." The highest water purity that is practically achievable would have a specific resistance of 18,300,000 ohms-cm (18.3 Meg ohms-cm).

The invention of the mixed ion bed in the early 1950's (see U.S. Pat. Nos. 2,578,937 and 2,692,244) had a dramatic effect in the art of water purification. Mixed bed ion exchangers can produce ultrapure water, defined above as water with a specific electric resistance of 18 Meg ohms-cm (18,000,000 ohms-cm). However, mixed bed ion exchangers are less efficient than single ion bed exchangers and the mixed ion bed can be quickly exhausted. Therefor, conventional two bed ion exchangers, or reverse osmosis membranes, are usually used for a pre-treatment of the water fed to the mixed bed ion exchange.

The patents issued to Casolo, Boeve, Berry, Mahmud and Miyamura, discussed below, are directed to inventions for producing high purity water. All of the disclosed inventions include: known filtration means to remove undissolved impurities in the form of sediments; known adsorption means to remove colloidal and organic matters; and known ion exchange means to remove ionic impurities. In most of these inventions, mineral purification is accomplished in a two-step process utilizing conventional two or four bed ion exchange systems followed by mixed bed exchanges for final purification of the water. Berry proposes two mixed beds in series.

U.S. Pat. No. 3,985,648 to Casolo has, as an object, to optimize the efficiency of an ion exchange by adjusting the pH of the water as it passes through the different treatment units. A four (4) bed system plus a mixed bed and chelation resin were used. The bed arrangement was as follows: Strong Acid Cation followed by Weak Base Anion followed by Weak Acid Cation, followed by Strong Base Anion (SAC, WBA, WAC, SBA) and finally the mixed and chelation beds. The novelty in this arrangement is the addition of the Weak Acid Cation bed. The three-bed arrangement SAC, WBA, SBA is known from the prior art. In this arrangement the WBA (unit 28) neutralizes the acidic water coming from the SAC (unit 24). This neutral or high pH water enters the WAC (unit 32) and improves the efficiency of this bed. In the meantime, the water leaving the WAC (unit 32) has a low pH, which in turn improves the efficiency of the subsequent SAC (unit 36) in removing heavy metals. The mixed bed and the chelation bed are also known in the prior art. This system is a closed loop with no water discharge being allowed, for fear of contaminating waterways. Regeneration in place was not considered and no explanation is given as to how regeneration is to be accomplished or how to dispose of the accumulated industrial waste. This is a noticeable deficiency to this invention.

U.S. Pat. No. 4,548,716 to Boeve has, as an objective, to produce pyrogen free, ultrapure water with specific electrical resistance of at least 18 meg ohms-cm. The emphasis is on using pure ozone at concentrations of two mg/l in an ozone contactor to insure destruction of pyrogen. The system is capable of processing water from different sources. A relatively large collection of treatment techniques is used including coarse filtration, carbon adsorption, membrane separation, dual and mixed bed deionization and several disinfection units (three ultraviolet units and one ozone unit). All operations of this invention are individually known in the prior art.

U.S. Pat. No. 4,280,912 to Berry has, as an objective, to produce ultrapure water with a specific electrical resistance of at least 18 meg ohms-cm at the point-of-use. The system consists of all standard unit operations outlined above. In addition, it includes means to monitor purity up stream and down stream of the water purification system; to shutdown the system upon detecting specific resistances below 500,000 ohms-cm; and to measure and control water temperature. A final 0.2 micron filter is used at the dispensing spout. Current operation conditions imply that a pure water supply (which could be a dual or three-bed pretreatment deioniser) is used to feed this system.

U.S. Pat. No. 5,024,766 to Mahmud has, as an objective, to maintain the purity of an ultra pure water source at a low Total Organic Carbon (TOC) and bacteria at point-of-use. A purified water source with specific resistance of 17–18 meg ohms/cm is required. The point-of-use system includes a circulation loop that contains a pump, an ultraviolet unit, a 0.2 micron filter, a twin mixed bed polisher and an ozone generator sterilizer.

U.S. Pat. No. 5,259,972 to Miyamura has, as an objective, to produce, for the electronic industry, ultra pure water with a specific resistance of 10 meg ohms/cm or more and 10 parts per billion of nonvolatile residue. Removal of colloidal substance by oxidation with ozone into fine particles of oxides that can easily be removed and do not clog the reverse osmosis membrane is a primary goal. In addition to the conventional purification elements, a reverse osmosis membrane is used as a last filtration element to remove particles that can't be removed by ion exchange.

U.S. Pat. No. 5,190,659 to Wang has, as its object, to provide a point-of-entry (POE) water conditioning system. The proposed system will partially treat water contaminants. It is not intended to produce high purity water. The primary components are the vessels for filter media (a wide array of reactive and regenerative compounds that are intended to treat specific problems are disclosed), a process tank for regeneration and chemical circulation, a central flow control (without a description of how it works), a pump and ultra-violet units.

U.S. Pat. No. 5,259,975 to Mohn has, as an object, to complex and stabilize waste water metal hydroxide bearing sludge with tolyl triazole to inhibit leaching of metal from the sludge into the environment.

A two-bed cation/anion ion exchanger is a relatively simple device, but it does not achieve the high level of water purity required by some technologies, such as the electronic and pharmaceutical industries. On the other hand, the known mixed bed devices produce very high purity water but they are less efficient and require cumbersome means to segregate, regenerate and remix the ion exchange resin.

SUMMARY OF THE PRESENT INVENTION

The primary object of the present invention is to produce high purity water using an economic and efficient cascade ion exchange. The method and system of subject invention provide a continuous series of segregated and alternating determinate sized beds of cation and anion resins forming a cascade water treatment path. The method and system also provide for a backflush or regeneration of the system in which the like ion beds are treated in a like manner, all the cation beds being separately treated simultaneously with treatment of all the anion beds. The sum total resin height for all of the cation and anion resin beds is at least equivalent to that of a conventional two-bed system. It has been proven that arranging the ion exchange in this fashion can produce water with a purity higher than that of the two-bed system and approaching that of a mixed bed. Since the beds are segregated, counterflow regeneration means can be provided to regenerate the layers in a fashion similar to that used for the regeneration of a two-bed system. This method is far more efficient and less complex than any other known means for regeneration of a mixed bed system.

BRIEF DESCRIPTION OF THE DRAWINGS

The present invention will now be described, by way of example, with reference to the accompanying drawings, in which.

DETAILED DESCRIPTION OF AN EMBODIMENT OF THE INVENTION

The cascade ion exchange of the present invention is intended to produce water of ultrapure quality, as previously defined. The typical ion exchanger, discussed above, contains two ion resin beds, each bed having only one type of ionic resin, either a cation or an anion, in what is known as a two-bed system. Another class of ion exchanger is known as a mixed bed system and contains a mixture of both cation and anion resins in a single bed. The resin particles, being intermingled next to each other, constitute a plurality of two-beds. Just as a four-bed system would be expected to produce water which is more pure than a two-bed system, the mixed bed system produces water which is more pure than either the two or the four bed systems, but the mixed bed has some deficiencies. In order to regenerate a mixed bed ion exchange system, the cation and anion resin particles must be separated (based on their density) into two distinct layers. However, regeneration of a mixed bed system is always less efficient than with other types of bed systems due to the inability to completely segregate reagents at the interfaces between the two resin layers.

The subject cascade ion exchanger overcomes the difficulties of the prior art by providing a plurality of alternating ion segments, compartments, chambers or units. The cascade ion exchanger tower embodiment 10 consists of a series of alternating cation ion resin exchanger chambers 12 and anion ion resin exchanger chambers 14 in a single housing 16. The subject invention provides a unique arrangement wherein, in a normal operational mode, water flows in cascading order sequentially downwardly through all segments. In a backflow or regeneration mode, the wash flows sequentially upwardly only through like cation or anion chambers. The embodiment of the subject invention shown can be varied with any number of pairs of chambers, for any given application. The required amounts of cation resin and anion resins are housed in relatively small quantities, preferably in shallow layers, in a cascading series of alternating beds, cation followed by anion followed by cation and so on. Thus a series of six to twelve beds can contain an amount of resin equivalent to that of a large two-bed system without having a significant increase in overall size while providing a significant increase in the purity of the water produced and the capacity of the exchange resins.

Figure 1:
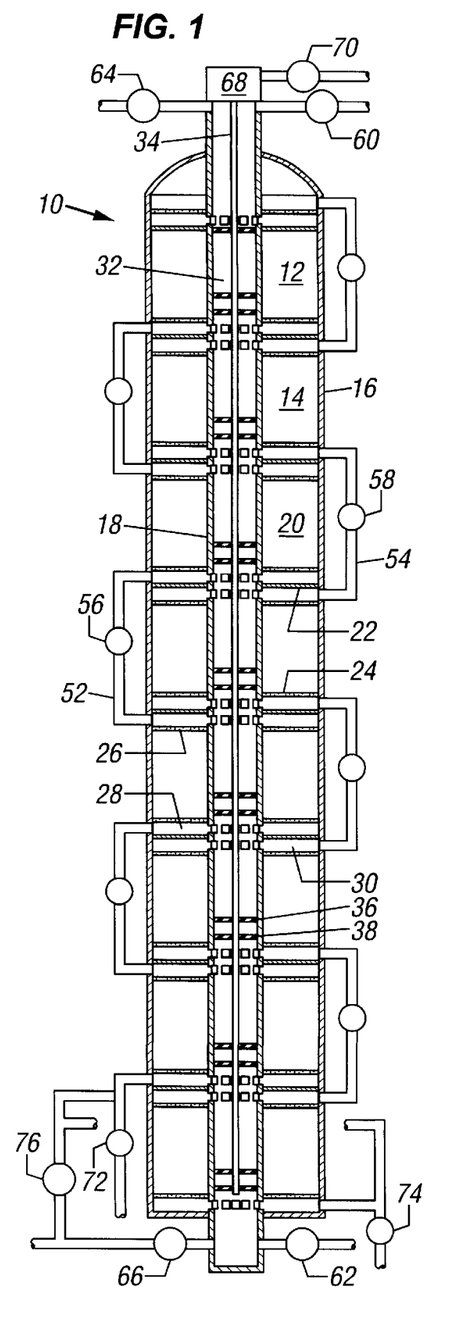
FIG. 1 is a vertical section through an embodiment of the subject cascade bed ion exchanger shown in the normal operating mode.
Figure 2:
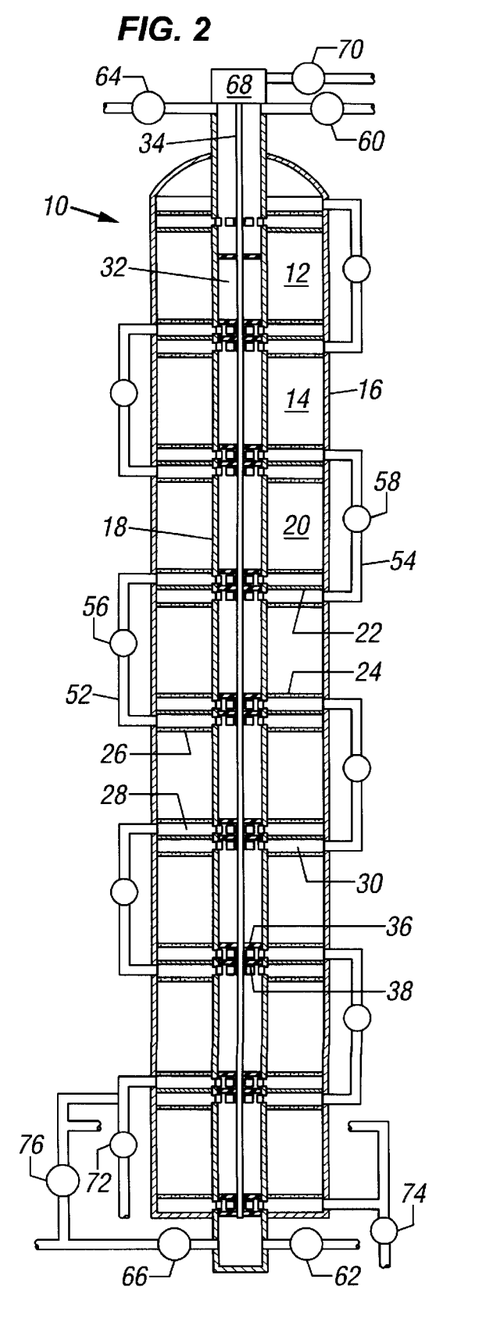
FIG. 2 is a vertical section, similar to FIG. 1, showing the embodiment of the subject cascade bed ion exchanger shown in the backflush or regeneration mode.
Figure 3:
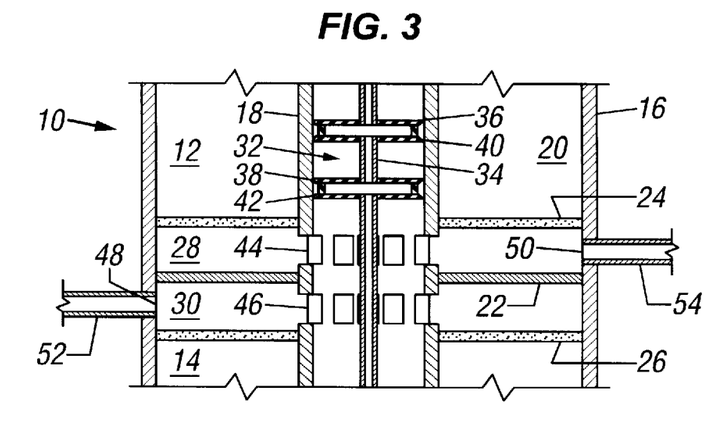
FIG. 3 is a detailed vertical section through a segment of the cascade bed ion exchanger shown in the normal operating mode.
Figure 4:
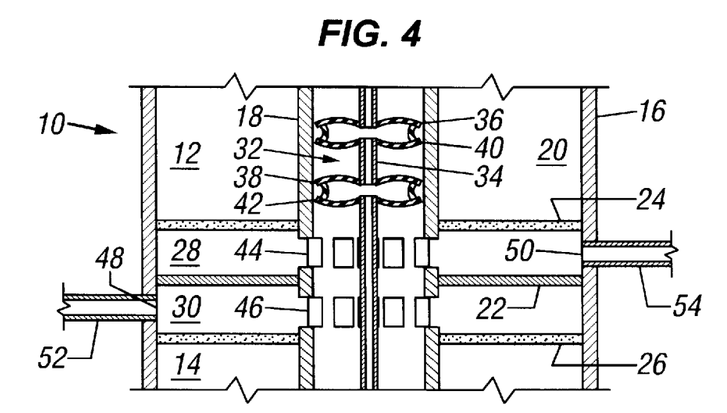
FIG. 4 is a detailed vertical section through a segment of the cascade bed ion exchanger shown in preparation for setting the linear valve for the regeneration mode.
Figure 5:
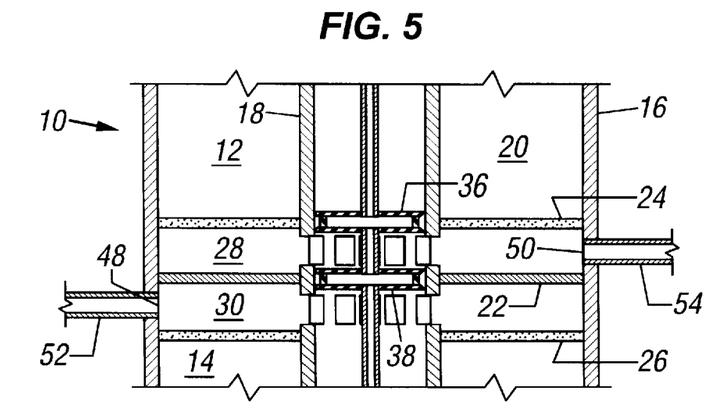
FIG. 5 is a detailed vertical section through a segment of the cascade bed ion exchanger shown in the backflush or regeneration mode.

Turning now to FIGS. 1 to 5, the exchanger 10 has a preferably cylindrical outer housing 16 with a preferably annular inner housing 18 coaxially mounted therein defining an annular space 20 therebetween. This annular space 20 is divided into a plurality of preferably uniform ion chambers, segments, compartments, or units 12,14 by a plurality of preferably equally spaced impermeable bed separation plates 22 fixed in parallel spaced fashion extending radially between, and sealingly engaging, the outer housing 16 and the inner housing 18. Spaced above and below each bed separation plate 22 are permeable resin retaining plates or screens 24, 26, each fixed in a manner similar to the plates 22 and adapted to retain the resin (not shown) in the respective chamber and prevent the resin from being washed from the chamber, regardless of the direction of fluid flow. These plates or screens define smaller annular chambers or voids 28, 30 on opposite sides of plates 22. A linear valve 32 extends the length of the exchanger 10 and has a hollow valve rod 34 extending axially through inner annular housing 18 with a plurality of spaced pairs of radially extending seal means 36, 38. The profiled circumferential edge portion 40, 42 of each seal means 36, 38 (see FIGS. 3 to 5), in the normal or unpressurized condition shown in FIGS. 3 and 5, sealingly engages the inner surface of the inner annular housing 18. Each seal means 36, 38 is connected, at its radially inner end, to the hollow rod 34 of linear valve 32 and is made of a resilient material so that, when the hollow rod 34 is pressurized, the seal means 36, 38 inflate, as shown in FIG. 4, drawing the circumferential edge portions 40, 42 away from, and even out of contact with, the inner wall of the inner housing 18. On each side of each bed separation plate 22, the inner housing 18 is provided with a plurality of orifices 44, 46. Also on either side of the bed separation plate 22 are ports 48, 50 in the outer housing 16, each port connecting the respective chamber 12, 14 to pipes 52, 54, having valves 56, 58, respectively, therein to control flow through the pipes. The pipes 52,54 are connected to respective ports 48, 50 of the next adjacent chambers 12, 14, as shown in FIGS. 1 and 2.

Each tower would most likely be manufactured as a plurality of individual segments, each segment comprising a single compartment including the outer housing (with upper and lower ports), inner housing, one separation plate and a spaced pair of resin retaining plates. These segments, connected initially in pairs, would be assembled into a final unit of the required number of ion exchange resin pairs. The external plumbing would then be attached and the linear valve member inserted. Most likely the sections would be bolted together at flanges (not shown) and each section would be provided with a sealable hatch (also not shown) providing access to each chamber for the placement of the resins therein.

This embodiment is able to flow water through in a normal downflow fashion with the linear valve 32 in the position shown in FIGS. 1 and 3 and valves 56, 58 closed. In this condition, water flows through chamber 12, porous retaining plate 24, void 28, orifices 44, inner housing 18, orifices 46, void 30, and porous plate 26 into chamber 14. When it is time to regenerate the resins, the valve rod 34 is pressurized with air, or any other convenient gas, to inflate the seal means 36, 38 to the unsealed condition, shown in FIG. 4. When the seal means 36, 38 are expanded in such fashion, they break sealing engagement with the inner housing 18 and allow for low force, low wear movement between set positions. The linear valve 32 is then moved downwardly, from the position shown in FIGS. 1 and 3 to the position shown in FIGS. 2 and 5, at which time the valve rod 34 is depressurized allowing the seal means 36, 38 to return to the condition shown in FIG. 5 with the seal means 36, 38 sealingly engaging the inner surface of the inner housing on opposite sides of orifices 44. Regenerating fluids can then be introduced and backflowed through the respective ion chambers without contaminating either the cation resins or the anion resins. The regeneration flow for the cation resins would go from chamber 12, through porous plate 26, void 30, port 48, pipe 52, valve 56, port 48, void 28, porous plate 24 into the next higher chamber 12. The regeneration flow for the anion resins would go from chamber 14, through porous plate 26, void 30, port 50, pipe 54, valve 58, port 50, void 28 and porous plate 24 into the next higher chamber 14.

Regeneration is accomplished in a countercurrent or upward flow mode, FIG. 2. Regeneration can be triggered many ways, for example in a timed sequence or when produced water purity starts to deteriorate below a set level, or after processing a set volume of water. It consists of several steps; backwash, acid/caustic resin regeneration, slow and fast rinse of each bed and final rinse of the whole tower. The water supply valve 60 and the produced water valve 62 are closed. The drain valve 64 is opened. Then the backwash valve 66 is fully opened to allow a surge of high flow rate pure water from storage (not shown) preferably at a rate of at least 15 gpm/sq.ft. of bed cross section. The high flow rate is recommended to throughly back wash the beds and fluidize the resins to dislodge any accumulated debris and foreign objects that could affect resin efficiency. The backwash with water usually takes about five minutes.

Following backwash, resin regeneration starts. The backwash valve 66 is closed while the drain valve 64 remains opened. Cation and anion beds must be isolated to achieve resin regeneration. The linear valve 32 control mechanism 68 is activated to accomplished the desired isolation. Low pressure gas, such as air or nitrogen, is admitted to control mechanism 68 from a source (not shown) through valve 70 and is introduced to the hollow shaft 34 of the linear valve 32. The pressurized gas inflates the elastomer seal means 36, 38, as shown in FIG. 4, forming rounded contours having slightly smaller circumferences than the seal means at rest and form a loose contact with the inner surface of inner housing 18. This reduces friction when the valve shaft 34 is moved up and down the inner housing 18. This makes valve movement much easier and extends the life of the seal means. Following pressurization, the rod 34 is moved downward, with either a cork screw or linear movement, to the new position. The valve 70 is closed and the pressure is released to deflate the valve means 36, 38 to their original shape sealingly engaging the inner housing (see FIGS. 2 and 5).

Thereafter acid valve 72 and caustic valve 74 are opened (along with valves 56, 58) to allow for diluted acid and caustic, at specific concentration, to flow through the cation and anion beds 12, 14, respectively. After regeneration, residual acid and caustic are flushed from the respective ion resin beds by a slow rinse of pure water followed by a fast rinse with more pure water. This is accomplished by closing acid and caustic valves 72, 74 and opening rinse valve 76. After resin rinsing with pure water, the rinse valve 76 and the valves 54 and 56 are closed.

After ion regeneration, the linear valve control mechanism 68 is activated to reset valve 32 to restore the system to the normal service mode (see FIG. 1). Once again, pressurized gas is used to inflate the seal means to facilitate the valve movement in an upward direction and then depressurized to restore the sealing contact. The backwash valve 66 is opened to allow for an upward final wash of the entire tower. Finally the backwash valve 66 and the drain valve 64 are closed and the produced water valve 62 opened and the system is once again ready for a new cycle.

To maintain continuity of pure water production, two or more cascade ion exchange units could be arranged so that, when one unit is in a regenerated mode, the other units remain in service. The units could be taken out of service routinely, as mentioned above, on a time cycle; after a specified volume flow; in response to a deterioration in the purity of the water being produced by any one unit; or by detection of reduced flow, possibly a stoppage, in any one unit Such an arrangement would insure continuous production of ultrapure water while maximizing the efficiency of each unit by preforming regeneration after the ion resins contained therein are completely exhausted.

For small capacity cascade systems, less than 10 gpm, fiber glass vessels or vessels made of light durable composite material (not shown) could be used. The vessels preferably would be mounted upside down on the top of a water flow control manifold (also not shown), for ease of vessel separation. Since normal service is downflow, the vessel inlet port would be provided with an extension tube (not shown) that penetrates upwardly through the resin and delivers water to the top of the resin in the vessel.

Cascade ion exchange for demand quantities less than 50 gpm can be provided by having multiple alternating short columns of cation and anion beds (not shown). These short columns, essentially a plurality of series connected individual chambers, preferably are single ended vessels, each less than two feet in height and designed to withstand supply header pressure. Each vessel is detachably mounted on a manifold (not shown) which provides for series flow sequentially through each vessel, in a normal mode, and through alternating pairs of vessels in a backflow or regeneration mode.

For higher flows, above 100 gpm, vessels become large and heavier. Therefore, vessels may be mounted under a water manifold (not shown). In this case the vessel head outlet port has an extended tube that penetrates the resin and withdraws treated water from the bottom of the vessel. In either case, the normal service of the system is downflow through the vessels. All other cycles, such as backwash, acid/caustic regeneration and rinse, have a countercurrent or upward flow mode. In this multiple bed design, conventional automated valves controlled by a time cycle are used to isolate the vessels and distribution piping.

Operation of multiple bed systems is analogous to the above described tower embodiment. In the normal service cycle, the manifold allows flow through the system in cascade fashion. For the backwash cycle, rinse water is pumped from a pure water source to backwash the resins separately. After backwashing the resins, regeneration of each of the resins separately starts. Regeneration is accomplished in a cascade counterflow mode separately through the resins. As before, regeneration can be triggered by measuring the conductivity of the water at the outlet to determine the purity of the produced water, by a timed cycle, by volume measurement, or by detection of a stoppage. In the regeneration cycle, a diluted acid and caustic are caused to flow through the cation and anion beds respectively. After regeneration, the system is flushed to remove any residual acid and caustic from the beds. This is followed by a slow rinse of the resins, with pure water, through the acid and caustic piping systems, followed with fast rinse with pure water. After the rinsing is completed, the acid and caustic regeneration piping systems are isolated. Before restoring the system to normal service, the whole system once again undergoes a final short rinse to remove any trace of regeneration agents that might have been trapped in the piping system. To accomplish this step all intermediate vessel isolation valves are opened and pure water is pumped through the backwash valve in a fashion similar to the previously described tower backwash.

To maintain continuity of pure water production, these multiple bed units could be arranged in an array of two or more units, each unit comprising at least one pair of cation and anion resin bed vessels. This allows one unit to be regenerated while the others are still in active service. Multiple units of these systems could also be mounted in parallel on a skid to allow for higher capacity and easier movement on site. The vessel isolation valves could be designed as linear motion single action valves, similar to that of the tower design.

Previously the efficiency of in-situ regeneration of mixed beds depended on the proper separation of the lighter anion resin from the heavier cation resin into two distinct layers. This was usually accomplished when the resin bed was fluidized in the countercurrent backwash cycle and was only achieved if the specific gravity of the anion resin was significantly lower than that of the cation resin. Otherwise, proper separation would not take place. However, this is not a problem with the present invention since the cation and anion resins are kept separate at all times and can be individually treated during regeneration.

In the subject cascade ion exchange system, cation and anion resins are placed in segregated layers or compartments and thus provide the following advantages. The cascade ion exchange system allows the use of any ion exchange resins or combination of resins, regardless of specific gravity or physical property of the resins. The subject cascade ion exchange system allows simultaneous use of different types of resins, such as the use of strong and weak acid cation resins and strong and weak base anion resins in the same cascade system.

Uniformity of the resin layer depth is important in maintaining resin efficiency, particularly in large diameter chambers, vessels, or other units. Large diameter chambers preferably would be provided with multiple concentric partition rings (not shown) with radial fins (also not shown) of sufficient height to extend well above the level of the resins would go a long way to minimize the disturbance of the resin layer, particularly when the bed is backwashed or regenerated. Bed partitioning would limit resin movement and migration to the space encompassed by the fins and the rings and, as a result, minimizing resin mal-distribution in these large diameter beds.

A study was conducted to determine the effectiveness of the subject cascade system as compared to both the conventional two-bed system and the mixed bed system, each having substantially equal total resin heights (resin volumes). The experiments used Rohm & Haas Amberlite IR-120 plus Strong Acid Cation Resin and Amberlite IRA-410 Strong Base Anion Resin. The resin was configured in two bed units (Cation and the Anion resins), mixed Cation and Anion resins, and the subject cascade of alternating compartments of Cation and Anion resins. The total Cation bed height was 30 inches. The total Anion bed height was based on resin ionic equivalency, or about 46 inches for this type of resin. One inch inside diameter borosilicate glass tubing, cut to different lengths, was used to form the compartments and columns. ACS Reagent Grade sodium hydroxide, sulfuric acid and sodium chloride chemicals were used throughout the experiment for resin testing and resin regeneration. A Barnstead Resistivity Meter, with an accuracy to 0.2 megohm, was used for all the tests. Deionized water with resistivity greater than 18 megohms was used to prepare the test solutions and for all other rise and washing requirements.

Three test apparatuses were produced, one each for a two bed, a mixed bed, and the subject cascade system. The conventional two-bed ion exchange system was represented by a one inch diameter tube was filled with 30 inches of strong acid cation exchange resin followed by a similar one inch diameter tube filled with 46 inches of strong base anion exchange resin. The mixed bed ion exchange system was represented by a one inch diameter tube was filled with 76 inches of throughly mixed cation and anion resins, in an ionic equivalency ratio. The cascading ion exchange apparatus was represented by alternating one inch diameter tubes of cation ion exchange resin with one inch diameter tubes of anion exchange resin to form six pairs. Each cation ion exchange resin of the cascade system was five inches long, for a total cation column length of 30 inches, and each anion exchange resin bed was 7.75 inches long, for a total anion ion exchange column length of 46 inches. The first cation exchange resin bed was connected to a peristaltic pump. The last anion exchange resin was connected to a resistivity meter. The flow through resin beds was down flow, from top to bottom.

Before packing the glassware apparatus with resin, the resin of both types were regenerated and rinsed. The IRA410 anion exchange resin was treated with 4% sodium hydroxide solution in deionized water at a rate of 0.5 gallons per minute and regeneration level of about four pounds of 100% sodium hydroxide per cu.ft. of resin. Similarly, the IR-120 cation exchange resin was treated with 2.5% sulfuric acid at a rate of 1.0 gallons per minute and regeneration level of about five pounds of 100% sulfuric acid per. cu. ft. of resin Thereafter, reagents were flushed and both types of resin were rinsed after regeneration with 0.5 gallons per minute of deionized water for five minutes.

The cascading system of alternating resin beds and the two-bed resin configurations were regenerated in a conventional manner, as described above. Regeneration of exhausted mixed beds resin was impractical and was not used. Instead the mixed resin was replaced after each test run.

Figure 6:
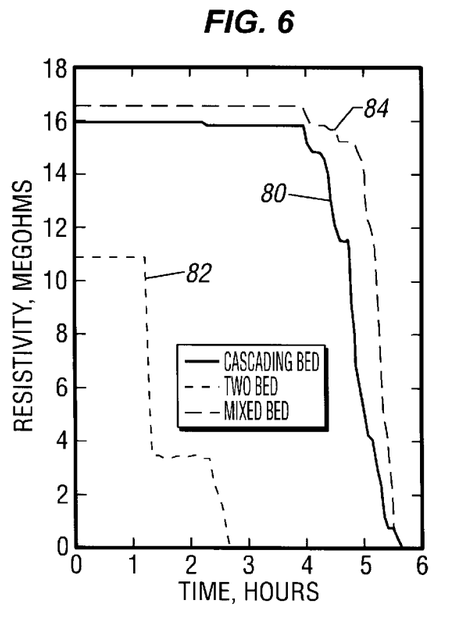
FIG. 6 is a graph showing a comparison of the subject cascade system, a two-bed system, and a mixed bed system using tap water.
Figure 7:
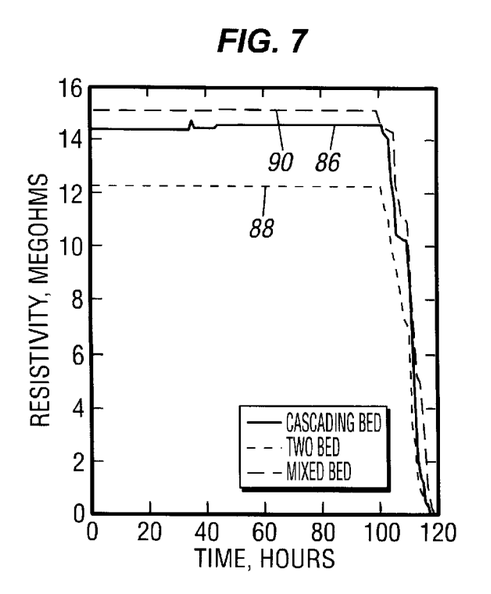
FIG. 7 is a graph showing a comparison of the subject cascade system, a two-bed system, and a mixed bed system using a 50 mg/l NaCl solution.
Figure 8:
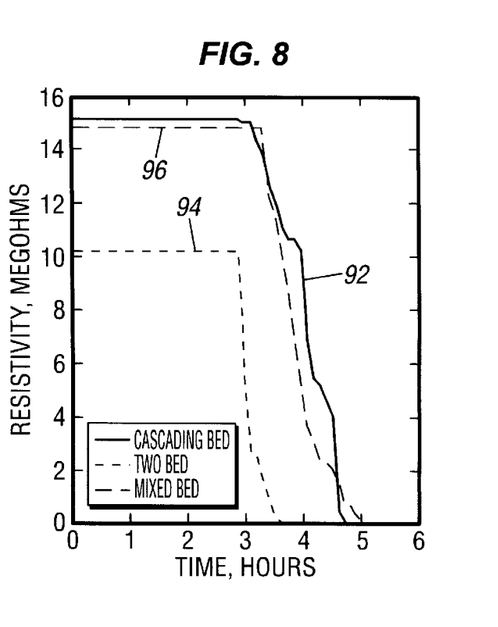
FIG. 8 is a graph showing a comparison of the subject cascade system, a two-bed system and a mixed bed system using a 500 mg/l NaCl solution.

In the test cases noted by the graphs of FIGS. 6 to 8, the subject cascade ion exchange system showed its superiority to the conventional two-bed ion exchange system. FIG. 6 is a comparison of the subject cascade system 80, a two-bed system 82, and a mixed bed system 84 using tap water at a rate of 2 gpm per cubic foot of resin. FIG. 7 is a comparison of the subject cascade system 86, a two-bed system 88, and a mixed bed system 90 using 50 mg/l sodium chloride at a rate of 2 gpm per cubic foot of resin. FIG. 8 is a comparison of the subject cascade system 92, a two-bed system 94 and a mixed bed system 96 using 500 mg/l sodium chloride solution at a rate of 2 gpm per cubic foot of resin.

A total of twenty-nine test runs were performed to evaluate the effect of water composition and water flow on cation and anion ion exchange resin performance arranged as conventional two bed, mixed bed, and cascading (alternating) ion exchange resin systems. Three different water compositions were used. Tap water containing 450 mg/l total dissolved solids, with a typical analysis in milligrams per liter, was measured as follows:

| Sodium | 53 | Chloride | 100 |
|---|---|---|---|
| Calcium | 323 | Carbonate | 230 |
| Potassium | 46 | Sulfate | 120 |
| Magnesium | 19 | Fluoride | 2 |

Solutions of 50 milligrams per liter and 500 milligrams per liter of reagent grade sodium chloride, prepared in deionized water, were also used. A 500 milligram per liter solution run was used as an extreme industrial application. Normally it is more economical to use other pretreatment, such as reverse osmosis, before polishing with ion exchange. Nevertheless, this was intended to evaluate the limits of the cascade system.

Three flow rates, two, for and eight gallons per minute per cubic foot or resin were used. These flow rates equated to 102, 204 and 408 milliliters per minute or five, ten and twenty gallons per square foot of bed cross section per minute. Two gallons per minute per cubic foot is the norm in industrial resin application. The high flow rate condition of 8 gallons per minute per cubic foot is an extreme and was only intended to evaluate the limits of the cascade ion exchange system.

Furthermore, the number of the beds in the cascade ion exchange bed was also examined using only one flow condition of 4 gallons per minute per cubic foot of resin using 50 milligrams per liter of sodium hydroxide solution. Series of four and eight beds, in addition to the standard six bed series, were tested. Total cation ion exchange bed length was maintained at 30 inches for all cases, with an ionic equivalent length of anion ion exchange resin.

The cascade ion exchange system achieved water purity of up to four times higher than the conventional two bed systems. Resin capacity was evaluated to be the time span that water purity is maintained at its highest level. In other experimental work, the cascade system had a capacity of up to five times that of a two-bed system.

For all tap water trials (see FIG. 6) the purity of the produced water exceeded 10 megohm. At the rate of 2 gpm/cu.ft. of resin, purity was as high as 16 megohm. Water with purity higher than 10 megohms was also achieved for the case of 2 and 4 gpm/cu.ft. rate with sodium chloride solutions in a concentration of 50 mg/l (FIG. 7) and for the case of 2 gpm/cu./ft. rate with a sodium chloride solution in a concentration of 500 mg/l (FIG. 8).

For tap water, with total dissolved solids of 450 mg/l and at flow rate of 2 gpm/cu.ft., the cascade ion exchange system purity was about 50% higher than the two bed system. The capacity of the cascade ion exchange was unexpectedly five times higher than the two bed system.

For low sodium concentration solution of 50 mg/l (FIG. 7), the cascade ion exchange system water purity was 20% to 90% (using a range of flows between 2 and 8 gpm per cubic foot, data not shown in this graph) higher than the two bed system and with slightly higher capacity.

On the other hand, the cascade ion exchange system compares favorably with a mixed bed having the same resin volume (FIGS. 6, 7, and 8). This implies that the cascade ion exchange system could be used in lieu of mixed beds.

For all tap water runs at 450 mg/l total dissolved solids (FIG. 6) and the sodium chloride solution at 50 mg/l concentration (FIG. 7), the cascade ion exchange system water purity was slightly lower than the mixed bed water purity. The difference was estimated to be less than 5%. The capacity of both resin configurations was comparable.

For the extreme case of 500 mg/l sodium chloride solution (FIG. 8), water purity was about 50% to 80% higher (using a wide range of flow between 2 and 8 gpm per cubic foot, data not shown) than the two-bed system with relatively higher bed capacity.

Four, six and eight cascaded pairs of ion exchange beds were configured. The lower number of bed pairs resulted in purity and capacity closer to the conventional two resin bed system.

The present embodiment has been described in two forms, a tower and a series of containers. In either form the concept is the same. Water is cascaded through all chambers in sequence in a production mode and, in the backflow or regeneration mode, water and regenerating solutions are passed through like pairs of resin chambers so that the cation and anion resins can be separately treated. This has proved to be a significant economic advantage in not only are the resins saved, but there are significant labor savings in the subject apparatus.

It should be noted that when beds of large scale are used, for example beds 4' in diameter or more, then it is advantageous to provide some type of baffle arrangement to foster maintaining a fairly uniform thickness of the resin bed. This can be accomplished with almost any type of device for breaking up flow patterns. For example, radial baffles or horizontal screens would serve this purpose.

The subject cascade arrangement will reap many of the benefits of mixed bed technology while having the advantage of completely segregating anion and cation beds. In the subject arrangement, regeneration is performed by a counterflow cascade with greater control of regeneration agents (acid and caustic) than in any other system. Where the bed depth is greater than bed diameter (as is the case with most of the smaller applications), a plug flow pattern is predominant and the ion exchange process is relatively efficient.

Cascading ion exchange systems could be used in almost any industry by appropriately choosing the arrangement of the cascade in a tower design and/or isolating beds. Perhaps the greatest potential for the present invention would be to satisfy modest demands (20–50 gpm) for pure water. For larger capacity units, an array of parallel connected smaller units could be skid mounted to meet most of the demands of light industry.

The subject invention may be adapted for commercial and light industry high purity water systems with a capacity up to 100 gallons per minute. Multiple units arranged in series or batteries could maintain continuous production of high quality water as well as the capacity to reach several hundred gallons per minute.

The cascade ion exchange for production of pure and ultrapure water to a capacity of 100 gpm, could be designed as a stacked multi-layer of shallow depth of 6–8 inches alternating beds of cation and anion exchange resin. These individual resin bed units are each provided with mounting means, such as radial flanges on both ends, are stacked on top of each other and are secured together by known means, such as bolts passing through abutting flanges. The tower is a self supported, space saving structure with, in normal service, water cascading downwardly through the alternating beds of cation and anion resins. Water supply valve 60, linear valve 32 and water product valve 62 are kept opened. All other valves are kept closed. Water purity generates the generation cycle. For a single tower water purification system, purity is measured before the last cation/anion beds in the cascade to insure water purity is maintained at the outlet. For twin tower or merry-go-round tower arrangement, water purity is measured at the water outlet of each tower to maximize the efficiency of the system.

Both the backwash fluids and the rinse water could be recovered, filtered, and recycled as water supply.

The present invention may be subject to many modifications and changes without departing from the spirit or essential characteristics thereof The above described embodiments should therefor be considered in all respects as being illustrative and not restrictive of the scope of the present invention as defined by the appended claims.

I claim:

1. A method for treating water to a purification of better than 10 Meg ohm-cm, comprising:
    providing a plurality of substantially identical columnar stacked chambers alternately containing beds of cation and anion resins and together forming a vessel having a single port formed on one end thereof with an inlet and an outlet therein, said vessel being detachably mounted by said one end on a manifold;
    providing an extension tube means extending from said inlet to the upper most bed controlling flow of water in a substantially axial annular first direction to flow downwardly through all beds sequentially in cascading sequence in normal service mode;
    providing means controlling flow of regenerating fluid in a non-axial opposite second direction passing through only like ion beds;
    directing a stream of water through said beds in said first direction to treat the water for removal of impurities therein; and
    periodically back flowing regenerating fluid in said second direction through like ion beds washing impurities and debris therefrom.

2. The method according to claim 1 wherein said impurities are ionic and dissolved impurities.

3. The method according to claim 1 wherein the cation and anion beds are arranged in pairs.

4. An apparatus for the treatment of water to remove substantially all of the impurities therefrom, said apparatus comprising:
    housing means comprising an outer housing and an inner housing together defining an annular space therebetween;
    a plurality of parallel spaced plates extending between said outer and inner housings defining therebetween a plurality of substantially uniform annular chambers each capable of holding a measured amount of ion exchange resin, said chambers forming pairs with one of said pair containing cation resin and the other containing anion resin;
    annular screens spaced to either side of each said plate defining annular spaces adjacent said plates and restricting movement of resin within said chamber;
    pipe means connecting alternate annular chambers in continuous pairs;
    first valve means for passing water in a first direction substantially axially through all adjacent chambers in cascading fashion; and
    second valve means providing parallel paths of flow in a second opposite direction, said second direction flow passing through only said pairs of chambers connected by said pipe means.

5. The apparatus according to claim 4 wherein said first valve means comprises:
    a plurality of apertures in said inner housing on each side of each of said plates;
    an elongated hollow valve stem extending coaxially through said inner housing; and
    a plurality of sealing means fixed in spaced pairs to said valve stem whereby positioning of said valve stem in a first position allows fluid communication through said inner housing past said plates and in a second position prevents fluid communication through said inner housing.

6. The apparatus according to claim 4 wherein said second valve means comprises:

a plurality of simultaneously actuated valves which, when actuated, connect alternate pairs of chamber segments allowing flow of fluid therethrough in said second direction.

7. The apparatus according to claim 4 further comprising:

cation resin substantially filling odd numbered chambers; and anion resin substantially filling even numbered chambers.

8. The apparatus according to claim 4 wherein said chambers are stacked one on top of the other forming a tower configuration.

9. The apparatus according to claim 4 wherein said chambers are separate side-by-side units connected to a manifold.

10. The apparatus according to claim 4 further comprising:

means to stabilize the height of resin beds in each said chamber during both normal flow and regeneration back flow.

11. The apparatus according to claim 10 wherein said stabilization means are a plurality of fins and arcs forming a flow mixing array.

12. The apparatus according to claim 10 wherein said stabilization means are horizontal screens.

13. The apparatus according to claim 4 further comprising:

at least two substantially identical tower configurations; and means controlling the flow through each said tower whereby each tower can be on line or any one tower can be off line and in a regeneration mode.

14. The apparatus according to claim 13 further comprising:

carousel means having said towers mounted thereon whereby easy access to the individual towers is provided.

15. A system for producing ultrapure water comprising:

an array of a plurality of short columnar vessels each containing a plurality of substantially identical chambers arranged in pairs with each chamber being capable of containing a determined amount of ion resin, each said chamber of each pair being at least partially filled with resin alternating between cation and anion resins in each adjacent chamber of each pair, each said vessel having an inlet and an outlet formed in a single port at one end for detachable mounting of said vessel by said one end on a manifold, an extension tube connected to said inlet and penetrating upwardly through the chambers to deliver water to the top of the vessels;

means for controlling flow of water sequentially through all of said chambers in a normal service mode in cascading fashion, and through alternating pairs of chambers in regeneration and rinse modes;

means for controlling flow of two separate regeneration fluids in said regeneration and rinse modes generally opposite said normal service mode whereby one of said two fluids passes through only those chambers containing cation resins and the other of said two fluids passes through only those chambers containing anion resins;

flowing water through said beds in a cascading series in said normal service mode whereby impurities contained within the water are removed; and flowing regenerating fluid through said chambers in said regeneration and rinse modes whereby the resins are regenerated and the impurities removed.

16. The system according to claim 15 wherein said chambers are stacked one on top of the other forming a tower configuration.

17. The system according to claim 15 further comprising:

means to stabilize the height of the resin in each said chamber during both normal flow and regeneration back flow.

18. The system according to claim 17 wherein said stabilization means are radial fins.

19. The system according to claim 17 wherein said stabilization means are horizontal screens.

20. A liquid treating apparatus comprising:

housing means having an outer housing member and an inner housing member together defining an annular space therebetween, a plurality of parallel spaced plates extending between said outer and inner housing members defining therebetween a plurality of substantially uniform annular chambers arranged in pairs;

resins substantially filling each said annular chamber annular screens spaced to either side of each said plate defining annular spaces adjacent said plates and restricting movement of resin within said chamber, said inner housing member having a plurality of apertures on either side of each of said plates opening into said annular spaces;

first linear valve means having an elongated hollow valve stem extending coaxially through said inner housing; and a plurality of annular sealing means fixed in spaced pairs to said valve stem to normally engage the inner surface of said inner housing member, whereby in a first position said valve stem allows fluid communication through said inner housing past said plates enabling liquid flow in a first direction through each of said chambers sequentially in cascading fashion, and in a second position prevents fluid communication through said inner housing;

second valve means having pipe means connecting alternate annular chambers in continuous pairs providing parallel paths of flow in a second opposite direction, each second direction flow passing through respective chambers of each pair.

21. The apparatus according to claim 20 wherein said sealing means are resilient whereby application of pressure to said hollow valve stem expands said sealing means out of contact with said inner housing facilitating movement of said first valve means.

22. The apparatus according to claim 20 wherein said second valve means comprises:

a plurality of simultaneously actuated valves which, when actuated, connect alternate pairs of chamber segments allowing flow of fluid therethrough in said second direction.

* * * * *